United States Patent [19]
Okada et al.

[11] Patent Number: 5,708,653
[45] Date of Patent: Jan. 13, 1998

[54] SINGLE-SUBSTRATE MULTI-LAYER OPTICAL DISK FOR READ-ONLY STORAGE AND PHASE CHANGE REWRITABLE STORAGE

[75] Inventors: Mitsuya Okada; Syuichi Ohkubo, both of Tokyo, Japan

[73] Assignee: NEC Corporation, Tokyo, Japan

[21] Appl. No.: 732,578

[22] Filed: Oct. 15, 1996

[30] Foreign Application Priority Data

Oct. 13, 1995 [JP] Japan ................. 7-265734

[51] Int. Cl.$^6$ .................................................. G11B 7/24
[52] U.S. Cl. ........................... 369/275.1; 369/94
[58] Field of Search .................. 369/13, 275.1–275.4, 369/94, 111

[56] References Cited

U.S. PATENT DOCUMENTS

| | | | |
|---|---|---|---|
| 5,218,599 | 6/1993 | Tsuyoshi et al. | 369/275.1 |
| 5,247,494 | 9/1993 | Ohno et al. | 369/275.1 |
| 5,304,440 | 4/1994 | Ono et al. | 369/275.1 |
| 5,422,871 | 6/1995 | Nakashima et al. | 369/58 |
| 5,610,901 | 3/1997 | Best et al. | 369/275.1 |
| 5,627,817 | 5/1997 | Rosen et al. | 369/275.1 |

FOREIGN PATENT DOCUMENTS

| | | |
|---|---|---|
| 0356064 | 2/1990 | European Pat. Off. |
| 0426409 | 5/1991 | European Pat. Off. |
| 0517490 | 12/1992 | European Pat. Off. |
| 0720159 | 7/1996 | European Pat. Off. |
| 0729142 | 8/1996 | European Pat. Off. |
| 4421221 | 12/1994 | Germany |

OTHER PUBLICATIONS

Patent Abstracts of Japan, vol. 018, No. 089 (P–1692), Feb. 14, 1994.
Patent Abstracts of Japan, vol. 094, No. 011, Nov. 4, 1994.
Patent Abstracts of Japan, vol. 014, No. 064 (P–1002), Feb. 6, 1990.
Patent Abstracts of Japan, vol. 009, No. 210, Aug. 28, 1985.
Patent Abstracts of Japan, vol. 095, No. 012, Dec. 8, 1995.
O. Imamura et al., "Erasable Optical Disk Technology", published by Trikeps Co., Ltd., 1993, p. 249.
K. A. Rubin et al., "Multilevel Volumetric Optical Storage", *SPIE*, vol. 2338, Optical Data Storage, 1994, pp. 247–253.
N. Nishiuchi et al., "Dual–Layer Optical Disk with Phase Change Rewritable and Read Only Layers", *Extended Abstracts of JSAP*, 1995, p. 959.

*Primary Examiner*—Nabil Hindi
*Attorney, Agent, or Firm*—Sughrue, Mion, Zinn, Macpeak & Seas, PLLC

[57] ABSTRACT

An optical disk includes a transparent rigid substrate, a phase change rewritable optical recording medium formed on the transparent rigid substrate, a transparent spacer formed on the phase change rewritable optical recording medium and having a grooved surface for storing information, and a reflecting layer formed on the grooved surface of the transparent spacer. The grooved surface of the transparent spacer and the reflecting layer form a read-only recording medium.

29 Claims, 3 Drawing Sheets

SINGLE-SUBSTRATE MULTI-LAYER OPTICAL DISK FOR READ-ONLY STORAGE AND PHASE CHANGE REWRITABLE STORAGE

BACKGROUND OF THE INVENTION

1. Field of the Invention

The present invention relates to an optical disk, and more particularly, to a single-substrate multi-layer optical disk for read-only storage media and phase change rewritable storage media.

2. Description of the Related Art

Optical disks suitable for large capacity are classified as a read-only type, a write-once type and a rewritable type.

The read-only type optical disks are used as compact-disk read-only memories (CD-ROM) in personal fields and image compressing technology such as Moving Picture Image Coding Experts Group Phase 2 (MPEG2). Also, the read-only type optical disks are used as laser disks for high definition television (HDTV). The read-only type optical disks are needed to be more integrated with increased capacity.

The write-once type optical disks can be written to by users. The write-once type optical disks are used, for example as external memories for computers, document files and image files. The write-once type optical disks are also needed to be more integrated with increased capacity.

The rewritable type optical disks can be written to and erased repeatedly by users. Also the rewritable type optical disks are used, for example, as external memories of computers, document files and image files. The rewritable type optical disks are further divided into phase change rewritable optical disks using a phase change of a recording layer and magneto-optical disks using a change of magnetization direction of a magnetic layer. The rewritable type optical disks are also needed to be more integrated with increased capacity.

Generally, the read-only type optical disk includes a grooved substrate and a reflecting metal layer made of aluminum alloy formed thereon. The write-once optical disk includes a low melting temperature metal layer made of metal alloy of Te, Bi, Se or an, or a dye active layer having an absorption characteristic coated on a substrate. The phase change rewritable optical disk includes a recording layer made of GeSbTe, InSbTe, InSe, InTe, AsTeGe, TeOx—GeSn, TeSeSn, SbSeBi or BiSeGe. The magneto-optical disk includes a metal alloy of rare earth metal such as Tb, Gd, Dy or Ho and a transition metal such as Fe, Co or Ni sandwiched by transparent passivation layers made of SiN or the like. The layers used herein are deposited by a resistance heating vacuum evaporation method, an electron beam vacuum evaporation method, a sputtering method, or a spin coating method.

In order to increase the integration and capacity of optical disks, a prior art single-substrate single-layer optical disk, which is called a partial read-only memory (ROM) disk, was known in which a substrate of the disk is divided into three areas: a read-only area, a write-once area and a rewritable area (see: "Erasable Optical Disc", Trikeps Co. Ltd., pp. 249, 1993).

In the above-mentioned prior art single-substrate single-layer optical disk, since the three areas are arranged two-dimensionally in the substrate, it is actually impossible to increase the integration and capacity.

A prior art dual-substrate dual-layer optical disk includes two substrates each having a recording layer formed thereon.

In the above-mentioned prior art dual-substrate dual-layer multi-optical disk, however, the disk has to be read from both sides, which requires separate disk drive units. This also increases the manufacturing cost and makes the control complex.

A first prior art single-substrate multi-layer optical disk includes a plurality of read-only type recording layers capable of being read from a single side (see: Kurt A. Rubin et al., "Multilevel Volumetric Optical Storage", SPIE Vol. 2338, pp. 247–253, 1994).

The above-mentioned first prior art single-substrate multi-layer optical disk, however, is only for read-only storage.

A second prior art single-substrate multi-layer optical disk includes a read-only type recording layer and a phase change rewritable recording layer (see: K. Nishiuchi et al., "Dual-Layer Optical Disk with Phase Change Rewritable and Read Only Layers", Extended Abstract of JSAP, pp. 959, 1995).

In the above-mentioned second prior art single-substrate multi-layer optical disk, however, since the read-only type recording layer is formed over a substrate, and the phase change rewritable recording layer is formed over the read-only type recording layer, a reflecting layer for the read-only type recording layer needs to be transparent, so that data detection from the read-only type recording layer is unreliable. Also, it is difficult to form the phase change rewritable recording layer after the formation of the read-only type recording layer.

SUMMARY OF THE INVENTION

It is an object of the present invention to provide a reliable single-substrate multi-layer optical disk for read-only storage and phase change rewritable storage.

According to the present invention, an optical disk includes a transparent rigid substrate, a phase change rewritable optical recording medium formed on the transparent rigid substrate, a transparent spacer formed on the phase change rewritable optical recording medium and having a grooved surface for storing information, and a reflecting layer formed on the grooved surface of the transparent spacer. The grooved surface of the transparent spacer and the reflecting layer form a read-only optical recording medium.

Since the reflecting layer does not need to be transparent, the reflecting layer can be made of metal in the same way as the conventional CD-ROM, so that the data detection of the read-only optical recording medium can be reliable. Also, since the read-only recording medium can be formed after the formation of the phase-change rewritable optical medium, it is easy to manufacture the optical disk.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENTS

Figure 1:
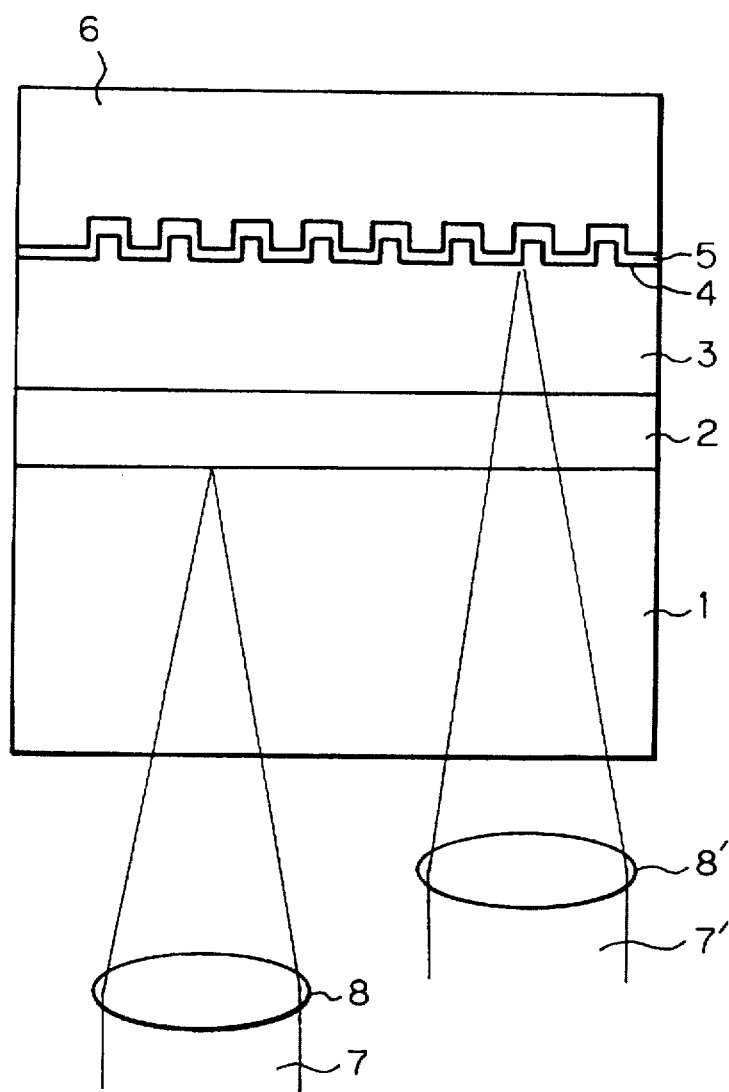
FIG. 1 is a cross-sectional view illustrating an embodiment of the optical disk according to the present invention.

In FIG. 1, which illustrates an embodiment of the present invention, reference numeral 1 designates a transparent rigid substrate made of polycarbonate which is about 130 mm in diameter, about 1.2 mm thick and has a track pitch of about 1.0 μm. Also, a phase change rewritable recording medium 2 is formed on the substrate 1. The phase change rewritable recording medium 2 will be explained later in detail. Note that the substrate 1 can be made of transparent resin or glass.

A transparent spacer 3 made of about 25 μm thick ultravioletsetting resin is formed on the phase change rewritable medium 2 by a spin coating method. That is, the ultravioletsetting resin is coated on the phase change rewritable medium 2, and read-only information is transferred by a transparent stamper (not shown) to the ultravioletsetting resin, so that grooves (pits) 4 corresponding to the read-only information are formed on the surface of the ultravioletsetting resin. Then, the ultravioletsetting resin is hardened by ultraviolet radiation, and the transparent stamper is removed therefrom.

Further, a reflecting layer 5 made of about 150 nm thick Al alloy is formed on the grooved surface of the transparent spacer 3.

In addition, an overcoat layer 6 made of about 10 μm thick ultravioletsetting resin is coated on the reflecting layer 5.

An about 690 nm wavelength laser beam 7 or 7' is focused by a 0.55 numerical aperture objective lens 8 or 8' at the phase change rewritable recording medium 2 or at the read-only recording medium formed by the pits 4 and the reflecting layer 5. Note that, although the objective lenses 8 and 8' are illustrated, a single objective lens is actually provided, so that the single object lens is moved to different locations as occasion demands, to realize the objective lenses 8 and 8'.

Also, although the thickness of the substrate 1 is so designed as to obtain a certain rigidity of the substrate 1, the thickness of the substrate 1 is changed in accordance with the position and focal length of the objective lens 8. In addition, the thickness of the substrate 1 can be other values than the thickness of 1.2 μm of the conventional compact disks.

Figure 2:
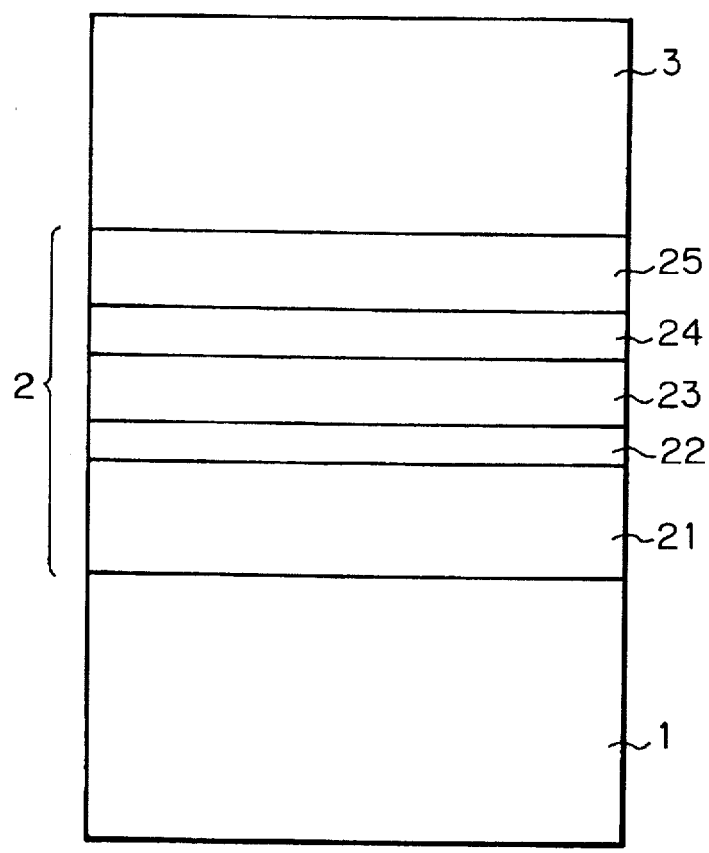
FIG. 2 is a detailed cross-sectional view of the phase change rewritable recording medium of FIG. 1.

The phase change rewritable optical recording medium 2 is explained in detail next with reference to FIG. 2.

A transparent lower passivation layer 21 made of about 230 nm thick ZnS—SiO$_2$, a phase change recording layer 22 made of about 10 nm thick Ge$_2$Sb$_2$Te$_5$, a transparent upper passivation layer 23 made of about 18 nm thick ZnS—SiO$_2$, a transparent reflecting layer 24, and a transparent interference layer 25 made of about 120 μm thick ZnS—SiO$_2$ are deposited sequentially on the substrate 1 by a sputtering method.

The transparent reflecting layer 24 can be made of about 60 nm thick silicon (Si) by a sputtering method using a silicon target in an argon atmosphere. Also, the transparent reflecting layer 24 can be made of about 75 nm thick germanium (Ge) by a sputtering method using a germanium target in an argon atmosphere.

Further, the transparent reflecting layer 24 can be made of about 120 nm thick silicon oxide (SiO) by a reactive sputtering method using a silicon target in an argon/oxygen atmosphere. Or, the transparent reflecting layer 24 can be made of about 110 nm thick silicon nitride (SIN) by a reactive sputtering method using a silicon target in an argon/nitrogen atmosphere.

In addition, the transparent reflecting layer 24 can be made of about 100 nm thick germanium oxide (GeO) by a reactive sputtering method using a germanium target in an argon/oxygen atmosphere. Or, the transparent reflecting layer 24 can be made of about 95 nm thick germanium nitride (GeN) by a reactive sputtering method using a germanium target in an argon/nitrogen atmosphere.

In the above-constructed phase change rewritable optical recording medium 2, when the phase change recording layer 22 is crystal, the transmission of 690 nm laser light is about 30 percent, while, when the phase change recording layer 22 is noncrystal, the transmission of 690 nm laser light is about 52 percent.

The inventors have performed a writing operation, an overwritting (erasing) operation and a reproducing operation upon the optical disk of FIG. 1.

First, the laser beam is focused by at the phase change rewritable optical medium 2 by a focus servo circuit (not shown) (see the reference numerals 7 and 8 of FIG. 1). Then, the phase change rewritable optical recording medium 2 was initialized. Then, the optical disk of FIG. 1 was rotated at a speed of 3600 rpm, and a signal having a frequency of 8.4 MHz and a duty ratio of 50 percent was written onto a track at a radius of 30 nm of the optical disk of FIG. 1. Then, a signal having a frequency of 2.2 MHz and a duty ratio of 50 percent was overwritten onto the same track. In this case, in order to minimize the secondary harmonic distortion, the writing laser power was 12 mW, 11 mW, 11.5 mW, 11.5 mW, 10 mW and 10.8 mW for the phase change rewritable optical recording medium 2 using Si, Ge, SiO, SiN, GeO and GeN, respectively, as the transparent reflecting layer 24, and also, the overwriting (erasing) laser power was 6 mW, 5.5 mW, 6 mW, 6 mW, 5 mW and 5.4 mW for the phase change rewritable optical recording medium 2 using Si, Ge, SiO, SiN, GeO and GeN, respectively, as the transparent reflecting layer 24. Finally, this track was produced, thus obtaining a reliable detection signal.

Next, the laser beam was focused at the read-only recording medium (4, 5) by the focus servo circuit. Then, the optical disk of FIG. 1 was rotated at a speed of 3600 rpm to reproduce data on the read-only recording medium. In this case, the reproducing laser power was 0.8 mW, thus obtaining a reliable detection signal.

In the above-constructed phase change rewritable optical recording medium 2, it is preferable that the transmission of laser light be about 30 to 60 percent. That is, when the phase change recording layer 22 is made thick, for example, 15 nm thick, the transmission of laser light is reduced. In this case, when the phase change recording layer 22 is crystal, the transmission of 690 nm laser light is about 22 percent, while, when the phase change recording layer 22 is amorphous, the transmission of 690 nm laser light is about 40 percent.

Also, the inventors have performed a writing operation, an overwritting (erasing) operation and a reproducing operation upon the optical disk of FIG. 1, where the phase change recording layer 22 was 15 nm thick.

First, the laser beam is focused at the phase change rewritable optical medium 2 by the focus servo circuit (see the reference numerals 7 and 8 of FIG. 1). Then, the phase change rewritable optical recording medium 2 was initialized. Then, the optical disk of FIG. 1 was rotated at a speed of 3600 rpm, a signal having a frequency of 8.4 MHz and a duty ratio of 50 percent was written onto a track at a radius of 30 nm of the optical disk of FIG. 1. Then, a signal having a frequency of 2.2 MHz and a duty ratio of 50 percent was overwritten onto the same track. In this case, in order to minimize the secondary harmonic distortion, the writing laser power was 12 mW, 11 mW, 11.5 mW, 11.5 mW, 10 mW and 10.8 mW for the phase change rewritable optical recording medium 2 using Si, Ge, SiO, SiN, GeO and GeN, respectively, as the transparent reflecting layer 24, and also, the over writing (erasing) laser power was 6 mW, 5.5 mW, 6 mW, 6 mW, 5 mW and 5.4 mW for the phase change rewritable optical recording medium 2 using Si, Ge, SiO, SiN, GeO and GeN, respectively, as the transparent reflecting layer 24. Finally, this track was reproduced, thus obtaining a reliable detection signal.

Next, the laser beam was focused at the read-only recording medium (4, 5) by the focus servo circuit (see the reference numerals 7' and 8' of FIG. 1). Then, the optical disk of FIG. 1 was rotated at a speed of 3600 rpm to reproduce data on the read-only recording medium. In this case, the reproducing laser power was 0.8 mW, however, a reliable detection signal could not be obtained.

The above-constructed transparent spacer 3 is preferably approximately 5 to 50 μm thick, in view of the focal length of the objective lens 9'. For example, if the transparent spacer 3 is 2 μm thick, when a reproducing operation is performed upon the read-only recording medium (4, 5), a reproducing operation may be performed upon the phase change rewritable optical recording medium 2. As a result, a reliable detection signal cannot be obtained. On the other hand, if the transparent spacer 3 is 60 μm thick, when a reproducing operation is performed upon the read-only recording medium (4, 5), the laser beam 8' is focused at a location within the transparent spacer 3 apart from the read-only recording medium (4, 5). As a result, a reliable detection signal cannot be obtained.

Figure 3:
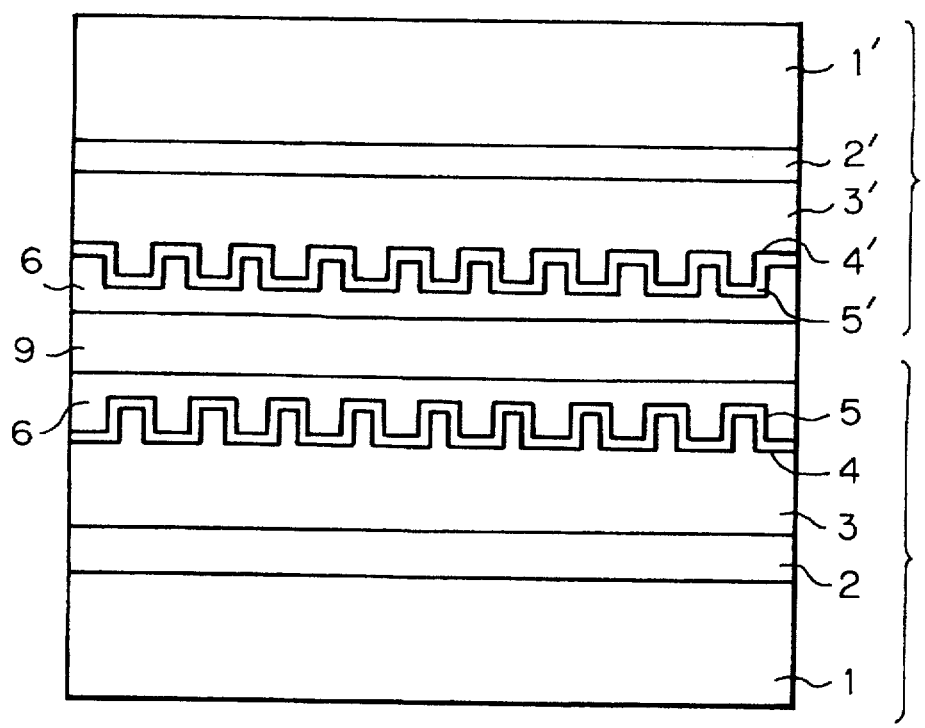
FIG. 3 is a cross-sectional view illustrating an optical disk to which the optical disk of FIG. 1 is applied.

In FIG. 3, which illustrates a modification to which the optical disk of FIG. 1 is applied, two disk portions A and B, each having the same configuration, are adhered by an adhesive layer 9. In this case, the overcoat layer 6 of the disk portion A is adhered by the adhesive layer 10 to the overcoat layer 6' of the disk portion B.

A writing, overwriting (erasing) or reproducing operation is performed upon the disk portion A by a laser beam incident from the substrate 1. On the other hand, a writing, overwriting (erasing) or reproducing operation is performed upon the disk portion B by a laser beam incident from the substrate 1'.

As explained hereinabove, according to the present invention, since the reflecting layer does not need to be transparent, the reflecting layer can be made of metal in the same way as the conventional CD-ROM, so that the data detection of the read-only optical recording medium can be reliable. Also, since the read-only recording medium can be formed after the formation of the phase-change rewritable optical medium, it is easy to manufacture the optical disk.

We claim:

1. An optical disk comprising:
   a transparent rigid substrate;
   a phase change rewritable optical recording medium formed on said transparent rigid substrate;
   a transparent spacer formed on said phase change rewritable optical recording medium and having a grooved surface for storing information; and
   a reflecting layer formed on the grooved surface of said transparent spacer,
   the grooved surface of said transparent spacer and said reflecting layer forming a read-only recording medium.

2. The optical disk as set forth in claim 1, wherein said phase change rewritable optical recording medium comprises:
   a transparent lower passivation layer formed on said transparent rigid substrate;
   a phase change recording layer formed on said transparent lower passivation layer;
   a transparent upper passivation layer formed on said phase change recording layer;
   a transparent reflecting layer formed on said transparent upper passivation layer; and
   a transparent interference layer formed on said transparent reflecting layer.

3. The optical disk as set forth in claim 2, wherein said phase change recording layer is made of Ge, Sb and Te.

4. The optical disk as set forth in claim 2, wherein each of said transparent lower passivation layer, said transparent upper passivation layer and said transparent interference layer is made of ZnS and $SiO_2$.

5. The optical disk as set forth in claim 2, wherein said transparent reflecting layer is made of Si.

6. The optical disk as set forth in claim 2, wherein said transparent reflecting layer is made of Ge.

7. The optical disk as set forth in claim 2, wherein said transparent reflecting layer is made of SiO.

8. The optical disk as set forth in claim 2, wherein said transparent reflecting layer is made of SiN.

9. The optical disk as set forth in claim 2, wherein said transparent reflecting layer is made of GeO.

10. The optical disk as set forth in claim 2, wherein said transparent reflecting layer is made of GeN.

11. The optical disk as set forth in claim 2, wherein transmission of laser light for said phase change rewritable optical recording medium is approximately 30 to 60 percent.

12. The optical disk as set forth in claim 1, wherein said transparent spacer is made of lightsetting resin.

13. The optical disk as set forth in claim 12, wherein said transparent spacer is approximately 5 to 50 μm.

14. The optical disk as set forth in claim 1, wherein said reflecting layer is made of metal.

15. An optical disk comprising first and second disk portions adhered by an adhesive layer,
    each of said first and second disk portions comprising:
    a transparent rigid substrate;
    a phase change rewritable optical recording medium formed on said transparent rigid substrate;
    a transparent spacer formed on said phase change rewritable optical recording medium and having a grooved surface for storing information;
    a reflecting layer formed on the grooved surface of said transparent spacer, the grooved surface of said transparent spacer and said reflecting layer forming a read-only recording medium; and
    an overcoat layer formed on said reflecting layer,
    said overcoat layer of said first disk portion and said overcoat layer of said second portion being adhered by said adhesive layer.

16. The optical disk as set forth in claim 15, wherein said phase change rewritable optical recording medium comprises:
    a transparent lower passivation layer formed on said transparent rigid substrate;
    a phase change recording layer formed on said transparent lower passivation layer;
    a transparent upper passivation layer formed on said phase change recording layer;
    a transparent reflecting layer formed on said transparent upper passivation layer; and
    a transparent interference layer formed on said transparent reflecting layer.

17. The optical disk as set forth in claim 2, wherein said phase change recording layer is made of Ge, Sb and Te.

18. The optical disk as set forth in claim 16, wherein each of said transparent lower passivation layer, said transparent upper passivation layer and said transparent interference layer is made of ZnS and $SiO_2$.

19. The optical disk as set forth in claim 16, wherein said transparent reflecting layer is made of Si.

20. The optical disk as set forth in claim 16, wherein said transparent reflecting layer is made of Ge.

21. The optical disk as set forth in claim 16, wherein said transparent reflecting layer is made of SiO.

22. The optical disk as set forth in claim 16, wherein said transparent reflecting layer is made of SiN.

23. The optical disk as set forth in claim 16, wherein said transparent reflecting layer is made of GeO.

24. The optical disk as set forth in claim 16, wherein said transparent reflecting layer is made of GeN.

25. The optical disk as set forth in claim 16, wherein transmission of laser light for said phase change rewritable optical recording medium is approximately 30 to 60 percent.

26. The optical disk as set forth in claim 15, wherein said transparent spacer is made of lightsetting resin.

27. The optical disk as set forth in claim 26, wherein said transparent spacer is approximately 5 to 50 μm.

28. The optical disk as set forth in claim 15, wherein said reflecting layer is made of metal.

29. A method for controlling an optical disk including a transparent rigid substrate, a phase change rewritable optical recording medium formed on said transparent rigid substrate, a transparent spacer formed on said phase change rewritable optical recording medium and having a grooved surface for storing information, and a reflecting layer formed on the grooved surface of said transparent spacer, the grooved surface of said transparent spacer and said reflecting layer forming a read-only recording medium, comprising:

means for performing a writing, erasing and reproducing operation upon said phase change rewritable optical medium by focusing a laser beam at said phase change rewritable optical medium; and means for performing a reproducing operation upon said read-only medium by focusing a laser beam at said read-only medium.

* * * * *